United States Patent [19]
Lieberman

[11] 3,855,068
[45] Dec. 17, 1974

[54] APPARATUS FOR INTER-BED MIXING OF A FLUID QUENCH MEDIUM AND A VAPOR-LIQUID MIXTURE

[75] Inventor: Norman P. Lieberman, Park Forest, Ill.

[73] Assignee: Standard Oil Company, Chicago, Ill.

[22] Filed: Oct. 2, 1972

[21] Appl. No.: 294,478

[52] U.S. Cl............... 196/155, 23/288 R, 208/146, 208/48 Q
[51] Int. Cl............................ C10g 11/10, B01j 9/04
[58] Field of Search....... 196/155; 23/288 R, 288 K, 23/283, 284; 261/13; 203/DIG. 6; 202/158; 208/146, 48 Q, 78

[56] References Cited
UNITED STATES PATENTS

| | | | |
|---|---|---|---|
| 3,378,349 | 4/1968 | Shirk................................. | 23/288 R |
| 3,502,445 | 3/1970 | Ballard et al...................... | 23/288 R |
| 3,592,612 | 7/1971 | Ballard et al...................... | 23/288 R |
| 3,445,343 | 5/1969 | Popov.......................... | 202/158 |
| 2,981,677 | 4/1961 | Bowles........................ | 23/288 R |
| 1,628,055 | 5/1927 | Newton........................... | 196/155 |
| 1,732,086 | 10/1929 | Flippen........................ | 261/113 |
| 3,223,616 | 12/1965 | Huntington................... | 23/288 R |
| 3,556,737 | 1/1971 | Boyd............................ | 261/113 |
| 3,746,515 | 7/1973 | Friedman..................... | 23/288 K |
| 3,198,727 | 8/1965 | Lifland........................ | 23/288 R |
| 3,607,000 | 9/1971 | Beal et al..................... | 23/288 R |

Primary Examiner—Norman Yudkoff
Assistant Examiner—D. Sanders
Attorney, Agent, or Firm—James L. Wilson; Arthur G. Gilkes; William T. McClain

[57] ABSTRACT

The apparatus comprises a horizontal vapor-liquid collection plate containing an aperture, a U-shaped pipe, a means for breaking up a fluid stream, and a horizontal chimney tray containing holes. The collection plate contacts the vertical walls of the vessel containing this apparatus. The first end of the U-shaped pipe is appended to the bottom side of the collection plate at the aperture and the opening at the second end of the U-shaped pipe is located below the bottom side of the collection pipe and positioned in such a manner that the fluid stream passing through the U-shaped pipe and emanating from the opening at the second end of the U-shaped pipe is directed toward and against the means for breaking up the fluid stream. Such means may comprise the bottom side of the collection plate. The chimney tray is located below the collection plate at a distance that is sufficient to permit on the chimney tray a liquid level that will provide substantially uniform distribution rates of liquid through the holes on the chimney tray at variable liquid rates to the chimney tray.

11 Claims, 5 Drawing Figures

3,855,068

APPARATUS FOR INTER-BED MIXING OF A FLUID QUENCH MEDIUM AND A VAPOR-LIQUID MIXTURE

BACKGROUND OF THE INVENTION

Processes for the hydroprocessing of petroleum hydrocarbon streams are employed in many of the modern day petroleum refineries. In some of these processes, certain types of reactions that occur are extremely exothermic. Generally, in such a process for the hydroprocessing of petroleum hydrocarbons, either mixed-phase fluid reactants or reactants in the vapor phase are passed continuously through one or more treating zones in a reaction vessel. Ordinarily, there are a plurality of treating zones, each zone comprising a fixed bed of a solid contact material, for example, a solid catalyst. As the reactants and partially processed fluids pass serially through the various zones or fixed beds, a considerable amount of heat is evolved.

A convenient way to offset the heat evolved and to control such exothermic reactions is to use a fluid quench medium, which may be either a liquid or a gas. Conveniently, such fluid quench medium may be introduced into the vessel to be intermingled with the stream or partially processed fluids in the void spaces between two treating zones. However, if such fluid quench medium is to effectively counteract the heat evolved and control any exothermic reaction present, the fluid quench medium and the moving fluids must be blended and mixed thoroughly prior to their introduction into the subsequent treating zone.

The apparatus of the present invention may be employed suitably to provide efficient mixing of a fluid quench medium and the vapor-liquid mixture that is emitted from a treating zone in a vessel, such as a hydroprocessing reactor. The apparatus may be employed also to remix the liquid obtained from the treating zone or bed of solids above the aparatus. The resulting mixture of fluid quench medium and partially processed fluids is then introduced into the first subsequent treating zone that is located in the vessel downstream from the treating zone from which the partially processed fluids were obtained.

SUMMARY OF THE INVENTION

According to the present invention, there is provided an apparatus for mixing fluids in a vessel between beds of solid contact material that are located in said vessel. Broadly, this apparatus comprises: a horizontal vapor-liquid collection plate having an aperture, said collection plate contacting and being sealed to the vertical walls of said vessel; a U-shaped pipe being appended to the bottom side of said collection plate at said aperture and the opening at the second end of said U-shaped pipe being below said bottom side of said collection plate and being positioned such that a fluid stream passing through said U-shaped pipe and emanating from said opening at said second end of said U-shaped pipe is directed toward and against a means for breaking up said fluid stream, said means comprising the bottom side of said collection plate; and a horizontal chimney tray having holes, said chimney tray being located below said collection plate at a distance that is sufficient to permit on said chimney tray a liquid level that will provide substantially uniform distribution rates of liquid through said holes at variable liquid rates to said chimney tray. The U-shaped pipe may be either horizontal or vertical. When the U-shaped pipe is horizontal, the preferred means for breaking up the vapor-liquid medium is a splash plate connected to the bottom side of said collection plate and positioned at such an angle with said bottom side that the fluid medium being directed toward and impinging upon said splash plate will rebound from the surface of said splash plate against the bottom side of said collection plate.

In a preferred embodiment, the chimney tray is suspended from and connected to the collection plate by means of a cylinder, the cylinder being concentric with the vessel and the axis of the cylinder being perpendicular to the plane of said chimney tray and the plane of said collection plate, the cylinder serving as a wall for an inner vessel containing the fluid passing from said collection plate through said U-shaped pipe to said chimney tray, and said chimney tray serving as the bottom of said inner vessel.

BRIEF DESCRIPTION OF THE DRAWINGS

Five figures are submitted herewith.

DESCRIPTION AND PREFERRED EMBODIMENT

Figure 1:
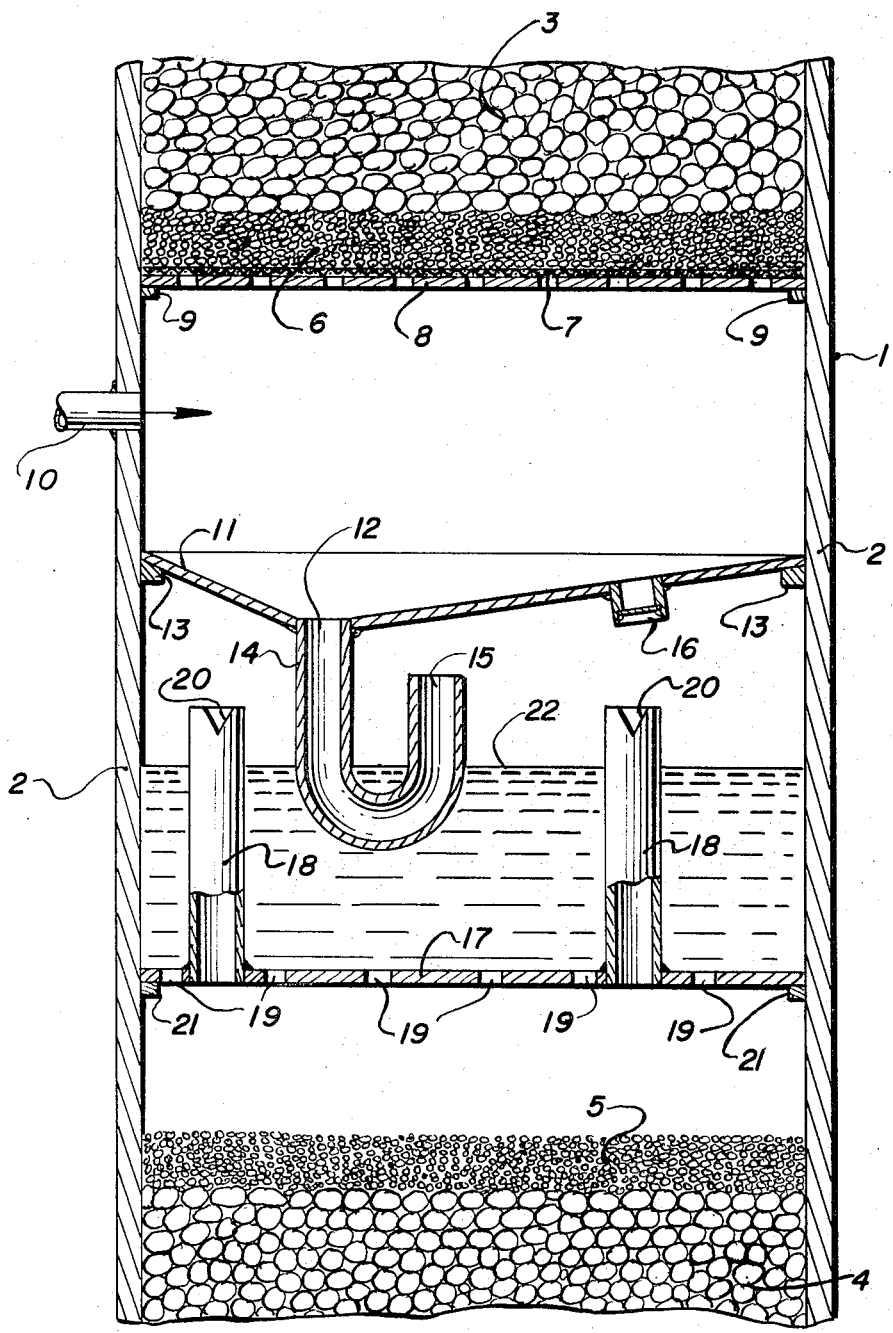
FIG. 1 presents, partially in section, a vertical cross-sectional view of a portion of a hydroprocessing reactor and an embodiment of the apparatus of the present invention supported therein. It shows diagrammatically in elevation the arrangement of the apparatus.

It may be desired to introduce a relatively cool fluid into a vessel to be mixed with relatively hot effluent descending in the vessel from a first bed of particulate solid contact material prior to the introduction of said hot effluent into a second bed of particulate solid contact material located downstream from said first bed. This would be a suitable way for controlling the temperature of the hot effluent, which may exist as a vapor-liquid mixture.

Today, processes directed to the hydroprocessing of petroleum hydrocarbon streams are used in many petroleum refineries. In such processes, there may be a need for thoroughly mixing one fluid medium with one or more different fluid media, which different fluid media are passing through a vessel from a first zone containing a fixed bed of particulate solid contact material to a second zone located directly downstream from the first. Such a mixing of fluids is quite important, if the process is one that is associated with exothermic reactions and that employs a catalyst as the particulate solid contact material. The heat generated by such exothermic reactions must be offset or controlled to ensure efficient operation. This may be done conveniently by employing a cooler liquid or gaseous fluid to cool the hot effluent passing from one catalyst zone or bed to another. This effluent would comprise products and unconverted reactants.

An example of a process for the hydroprocessing of petroleum fractions is a process in a typical fixed bed reactor wherein petroleum hydrocarbon residua are hydrotreated. The catalyst is positioned in a number of beds, which are interspaced by void spaces. A fluid quench medium, such as hydrogen, a hydrogen-containing gas, or a liquid, is introduced into each of these void spaces between the catalyst beds to quench the hot vapor-liquid mixtures that are passing from one catalyst bed to another. If the fluid quench medium is to provide effective cooling of the hot fluid stream passing between catalyst beds, it must be thoroughly mixed therewith. Another example of such a process is a process for the hydroprocessing of a lubricating oil distillate.

There has now been developed an apparatus that may be employed to mix one fluid medium with a two-phase fluid. More particularly, the apparatus may be employed to mix a cool fluid quench medium with a mixture of hot liquid and vapor that is being emitted from a bed of solid contact material. This mixing is done prior to the introduction of the resulting mixture of fluid quench medium and hot vapor-liquid mixture into the next subsequent bed of solid contact material that is positioned directly downstream from the bed of contact material from which the hot partially processed fluids were obtained. In addition, the apparatus may be employed to remix the liquid obtained from the bed of solid contact material above the apparatus.

The apparatus of the present invention is an apparatus for mixing fluids in a vessel containing beds of solid contact material, which mixing occurs between such beds. More particularly, the apparatus is an apparatus for the inter-bed mixing of a fluid quench medium and a vapor-liquid mixture in a vessel. This apparatus is located in the vessel between beds of the solid contact material. It is contemplated that one unit of the apparatus of the present invention can be used between the present invention can be used between the beds in each set of adjacent beds of contact material in the vessel. If the vessel were a reactor and the solid contact material were catalyst and the reactor contained eight catalyst beds along the length of the reactor, seven units of the apparatus would be employed.

Broadly, the apparatus of the present invention is an apparatus which comprises: a horizontal vapor-liquid collection plate having an aperture, said collection plate contacting and being sealed to the vertical walls of the vessel holding the apparatus; a U-shaped pipe, a first end of said U-shaped pipe being appended to the bottom side of said collection plate at said aperture and the opening at the second end of said U-shaped pipe being below said bottom side of said collection plate and being positioned such that a fluid stream passing through said U-shaped pipe and emanating from said opening at said second end of said U-shaped pipe is directed toward and against a means for breaking up said fluid stream, said means comprising the bottom side of said collection plate; and a horizontal chimney tray having holes, said chimney tray being suspended from and supported by the vertical walls of said vessel, being sealed to said walls of said vessel and being located below said collection plate at a distance that is sufficient to permit on said chimney tray a liquid level that will provide substantially uniform distribution rates of liquid through said holes at variable liquid rates to said chimney tray.

In one embodiment of the apparatus of the present invention, the means for breaking up the vapor-liquid stream emanating from said U-shaped pipe is the bottom side of the collection plate. In this embodiment, the U-shaped pipe is vertical. One end of the U-shaped pipe is connected at the aperture or orifice of the collection plate to the bottom side of the collection plate and the second end is positioned so that the fluid stream passing through the U-shaped pipe from the collection plate is directed toward and against the bottom side of the collection plate.

In another embodiment of the apparatus of the present invention, the means for breaking up the vapor-liquid stream passing through the U-shaped pipe is a combination of the collection plate and a splash plate, which is connected to the bottom side of the collection plate and is positioned at such an angle with said bottom side that the fluid stream being directed toward and impinging upon the splash plate will rebound from the surface of the splash plate against the bottom side of the collection plate.

While the collection plate is horizontaly positioned in the vessel, the collection plate is sloped downwardly from its outer periphery to the point where its aperture or orifice is located. The slope aids the fluid collecting upon the collection plate to drain from the outer periphery to the aperture for passage through the U-shaped pipe.

Conveniently, the collection plate may be equipped with a rupture disk. In such case, if the U-shaped pipe were to become plugged, a small pressure build-up could be relieved by means of the rupture disk.

It is contemplated that both the collection plate and the chimney tray may be suspended from the vertical walls of the vessel containing the apparatus by means that are well known to those skilled in the art. It is required that the collection plate be joined to the walls of the vessel in such a manner that fluid passing through the vessel will not pass between the collection plate and the vertical walls of the vessel. Appropriate conventional means of sealing, such as gaskets, may be employed to insure that no fluid passes between the collection plate and the walls.

The chimney tray contains both chimneys and holes and is located below the collection plate at a distance that is sufficient to permit on the chimney tray a liquid level that will provide substantially uniform distribution rates of liquid through the holes at variable liquid rates to the chimney tray.

Conveniently, each of the chimneys is notched at its top. These notches may advantageously be inverted triangular notches. The notches are employed as a precaution. If the holes on the chimney tray were to become plugged and the liquid level on the tray were to rise to the notches, the notches would facilitate the passage of liquid through the chimney along with the vapor to the next bed of solid contact material.

The minimum length of the chimneys must be sufficient to prevent liquid at the normally desired liquid level on the chimney tray from entering any of the notches at the top of the chimneys.

The diameter of the chimneys and the number of chimneys should provide a cross-sectional area that is sufficiently large to minimize the pressure drop through the chimney tray.

The holes in the chimney tray need not have an upper limit as to diameter. However, the holes should be large enough to avoid possible plugging. The number of these holes is governed by the desired level of liquid on the chimney tray, the quantity of liquid passing through the vessel, the size of the holes, and the cross-sectional area of the vessel.

In a preferred embodiment of the apparatus of the present invention, the chimney tray is connected to and suspended from the collection plate by a cylinder such that the walls of the cylinder act as the walls of an inner vessel and the chimney tray serves as the bottom of said inner vessel. The chimney tray is connected to and suspended from the end of the cylinder that is opposite the end to which the collection plate is attached. The cylinder is concentric with the vessel, and the axis of the cylinder is perpendicular to the plane of the chimney tray and plane of the collection plate. In this embodiment, the fluids coming from the U-shaped pipe and impinging upon the bottom side of the collection plate are contained in said enclosed inner vessel until the liquid passes through the holes of said chimney tray and the vapors pass through the chimneys of said chimney tray.

When such an inner vessel is employed, the apparatus becomes a one-piece unit. Bolts may extend upward from the collection plate around its outer periphery. A split-ring flange may be connected to the apparatus by these bolts. The split-ring flange in turn, may be bolted to extensions or a ledge around the inner walls of the outer vessel. Both the junction of the apparatus to the split-ring flange and the junction of the split-ring flange to the ledge may be sealed by some means, such as asbestos-ribbon-type gaskets. Such method of connection will facilitate the installation or removal of the unitary apparatus from the main or outer vessel.

The apparatus of the present invention and its use may be more easily understood after the following examples have been considered. These examples are presented for the purpose of illustration only and are not intended to limit the scope of the present invention.

EXAMPLE I

FIG. 1 represents in elevation a cross-sectional view, partially in section, of a segment of a reactor employing an embodiment of the apparatus of the present invention. Reactor 1 is being employed for the hydrotreating or hydrofinishing of a lubricating oil distillate.

The apparatus is contained within the walls 2 of the reactor 1. Suitable catalyst is employed in upper catalyst bed 3 and lower catalyst bed 4. A layer 5 of inert material, such as alundum balls, is located above catalyst bed 4. Likewise, a layer 6 of inert material is located below catalyst bed 3. Layer 6 of inert material rests upon a screen 7 and catalyst-bed-support grid 8, which is supported upon either a ledge or extensions 9.

The lubricating oil distillate being hydrofinished in reactor 1, along with a hydrogen-affording gas, passes through catalyst bed 3 and is partially converted to products. The unconverted feed, hydrogen-affording gas, and products that are formed in catalyst bed 3 pass through catalyst bed 3, inert layer 6, screen 7, and catalyst-bed-support grid 8. Quench gas, such as a hydrogen-containing gas, passes through quench line 10 into reactor 1, where it is contacted with the reactants and products descending from catalyst-bed-support grid 8. The fluids then collect on collection plate 11. Collection plate 11 slopes downwardly from its outer periphery to an aperture 12. This slope aids the liquid being retained by the collection plate to drain toward the aperture 12. Collection plate 11 is supported on ledge 13.

Connected at the aperture 12 to the bottom side of collection plate 11 is vertical U-shaped pipe 14. The fluid on collection plate 11 pass through aperture 12 into and through U-shaped pipe 14. The fluid stream leaving opening 15 of U-shaped pipe 14 is directed toward and against the bottom side of collection plate 11. Please note that rupture disk 16 (optional) is provided on collection plate 11. If there is a pressure build-up resulting from the plugging of U-shaped pipe 14, the rupture disk 16 will rupture and relieve such pressure build-up.

The fluid stream impinging upon the bottom side of the collection plate 11 is broken up into liquid and vapor components. The liquid collects upon chimney tray 17, which has both chimneys 18 and holes 19. Each of the chimneys 18 has an inverted triangular notch 20 at its top to relieve an excessive liquid build-up on tray 17. Chimney tray 17 is supported on ledge 21.

The liquid passes through the holes 19 in chimney tray 17 while the vapor passes through chimneys 18. The chimney tray 17 is located below collection plate 11 at a distance that is sufficient to permit on chimney tray 17 a liquid level 22 that will provide substantially uniform distribution rates of liquid through holes 19 at variable liquid rates to chimney tray 17.

The material passing through chimney tray 17, that is, the liquid and the vapor, contacts layer 5 of inert alundum balls and passes through that layer to the subsequent catalysts bed 4.

It is contemplated that such apparatus can be employed between each of the catalyst beds in the reactor. Hence, if there were six catalyst beds in the reactor, there would be five such pieces of apparatus being employed in the reactor.

Figure 2:
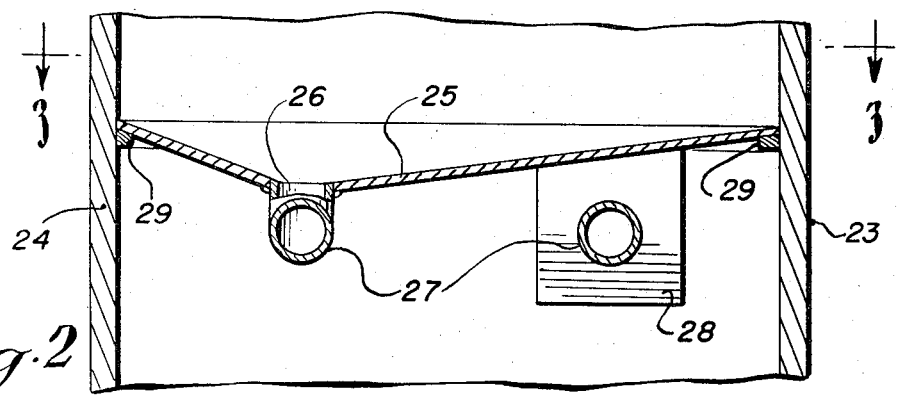
FIG. 2 presents a cross-sectional view of another embodiment of the apparatus of the present invention, as seen along line 2—2 in the accompanying FIG. 3. This figure also shows diagrammatically in elevation the arrangement of the apparatus.
Figure 3:
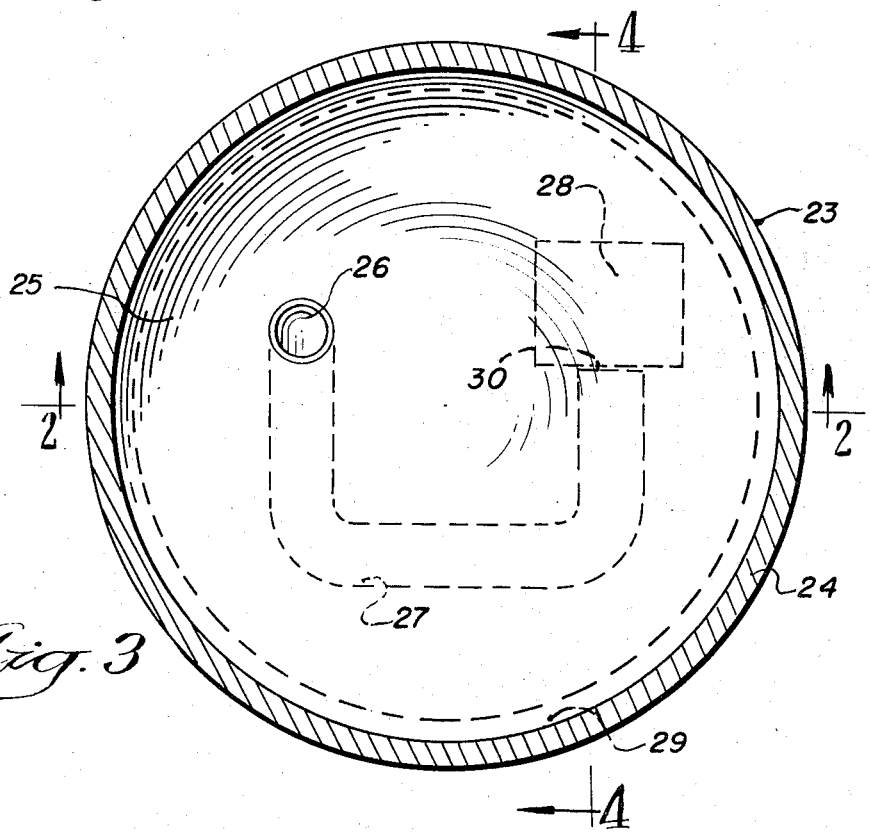
FIG. 3 shows a plan view of the embodiment of the apparatus of the present invention that is shown in FIG. 2 as seen along line 3—3 of FIG. 2.
Figure 4:
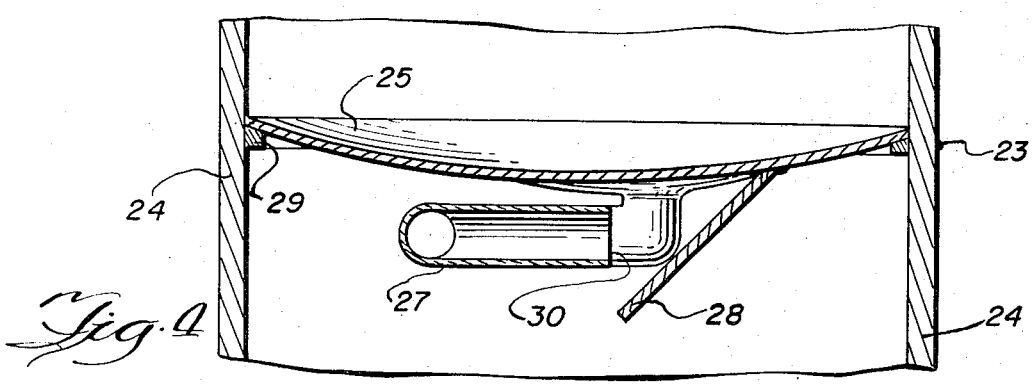
FIG. 4 shows an additional elevation of the embodiment of the apparatus that is presented in FIGS. 2 and 3, this elevation being seen along line 4—4 of FIG. 3.

To prevent leakage of fluid between the collection plate 11 and the side walls 2 of the reactor 1, or chimney tray 17 and side walls 2, a gasket or suitable other means may be employed.

in FIGS. 2, 3, and 4 is shown an alternate type of U-shaped pipe and its associated collection plate. FIG. 2 represents a cross-sectional view in elevation of this part of the apparatus, as seen along line 2—2 in FIG. 3. FIG. 3 represents a plan view of this assembly when looking along line 3—3 in FIG. 2. FIG. 4 represents a sectional view of this assembly, in elevation, as seen along line 4—4 of FIG. 3.

In this embodiment of the apparatus of the present invention wherein the U-shaped pipe is horizontal, the outlet of the U-shaped pipe faces a splash plate, which is connected to the collection plate at an angle that will permit the fluid stream emanating from the outlet of the U-shaped pipe to contact the face of the splash plate and rebound therefrom toward the bottom side of the collection plate. In FIGS. 2, 3, and 4, reactor 23 with walls 24 contains collection plate 25 with orifice 26 and its associated U-shaped pipe 27 and splash plate 28. Collection plate 25 is supported on ledge 29. The fluid collecting on collection plate 25 passes through orifice 26 into horizontal U-shaped pipe 27. The fluid stream in U-shaped pipe 27 is discharged through opening 30 and is directed against splash plate 28. The fluids bounce off the surface of splash plate 28 and are sent against the bottom side of collection plate 25. The fluid stream is broken up into liquid and vapor which pass to a chimney tray located directly below. This chimney tray is not shown in FIGS. 2, 3 and 4.

Figure 5:
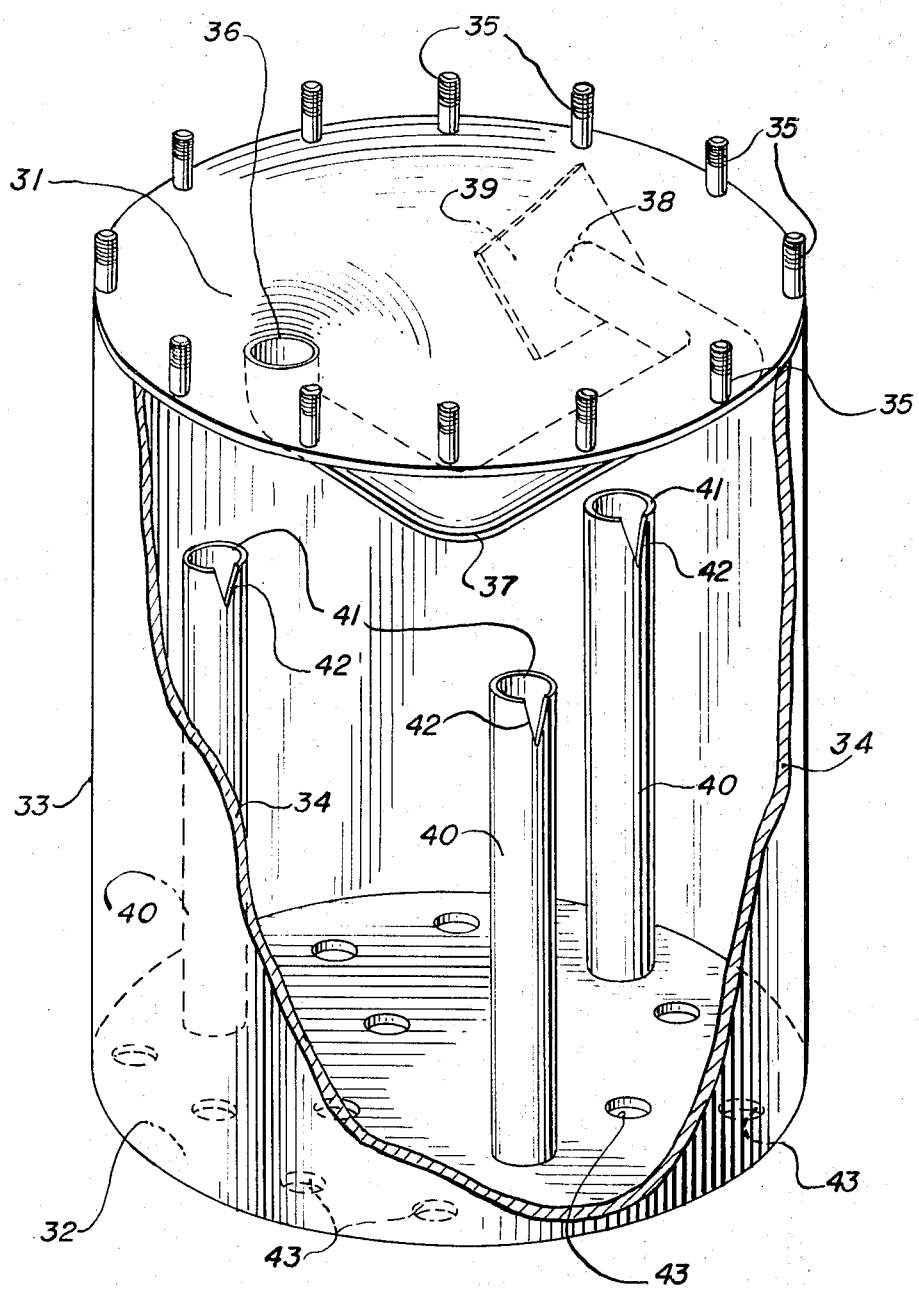
FIG. 5 presents an isometric view, partially in section, of an embodiment of the present invention wherein the collection plate and the chimney tray are connected to each other by a cylinder.

FIG. 5 presents an isometric view, partially in section, of a preferred embodiment of the apparatus of the present invention. In this preferred embodiment, collection plate 31 and chimney tray 32 are connected to one another by cylinder 33. This assembly is installed in the appropriate vessel or reactor so that the walls 34 of cylinder 33 are parallel to the walls of the containing vessel or reactor. As shown in FIG. 5, cylinder 33 is connected to the bottom side of collection plate 31 at the outer periphery of collection plate 31 and to the top side of chimney tray 32 at its outer periphery. Along the outer periphery of the collection plate 31 at its top side are a large number of bolts 35, which are employed to connect this embodiment of the apparatus of the present invention to the walls of the containing vessel or reactor. These bolts 35 are connected to a split-ring flange, which in turn is bolted to extensions or a ledge provided around the inner walls of the containing vessel or reactor. In FIG. 5, neither the split-ring flange, nor the ledge, nor the walls of the containing vessel or reactor are shown.

In this preferred embodiment of the apparatus of the present invention, liquid and vapor collect upon collection plate 31 and drain to aperture 36. The mixture of fluids then passes through aperture 36 and U-shaped pipe 37, which is connected to the bottom side of collection plate 31 at aperture 36. The fluids passing through U-shaped pipe 37 emanate from the opening 38 at its second end and impinge upon splash plate 39, from which they rebound and strike the bottom side of collection plate 31. The fluid mixture is broken up and falls toward chimney tray 32. The liquid material collects upon chimney tray 32, while the vapors pass to and through chimneys 40 by way of their orifices 41. Please note that there is an inverted notch 42 in each of the chimneys 40 at their orifices 41. These notches 42 facilitate the removal of liquid from the apparatus if there is an excessive build up of liquid on the chimney tray 32, while not hindering the passage of vapor through chimneys 40. The vapors pass down through chimneys 40 to the next section of the containing vessel or reactor. The liquid that is collected upon chimney tray 32 passes through holes 43 located in chimney tray 32 to the next section of the containing vessel or reactor.

This preferred embodiment of the apparatus of the present invention can be used advantageously to facilitate the installation of such apparatus. Mechanical problems associated with loading and unloading the containing vessel or reactor are minimized by such an embodiment.

The above-described embodiments of the apparatus of the present invention, as well as all those embodiments recognized by one skilled in the art as falling within the scope of the present invention, may be employed in those reactors for hydroprocessing petroleum hydrocarbon streams wherein multi-phase operation is present. Such hydroprocessing operations include, but are not limited to, the hydrofinishing or hydrotreating of lubricating oil distillates, white oils, and the hydrotreating of petroleum hydrocarbon residua.

What is claimed is:

1. Apparatus for inter-bed mixing of a fluid quench medium and a vapor-liquid mixture in a vessel containing at leaast two adjacent beds of solid contact material and having an inlet for said fluid quench medium between said beds of solid contact material, said apparatus being designed for use in said vessel at a location in said vessel such that said apparatus is between said beds of solid contact material and below said inlet, which apparatus comprises: a horizontal vapor-liquid collection plate having an aperture, said collection plate contacting and being sealed to the vertical walls of said vessel; a U-Shaped pipe, a first end of said U-shaped pipe being appended to the bottom side of said collection plate at said aperture and the opening at the second end of said U-shaped pipe being below said bottom side of said collection plate and being positioned such that a fluid stream passing through said U-shaped pipe and emanating from said opening at said second end of said U-shaped pipe is directed toward and against a means for breaking up said fluid stream, said means comprising the bottom side of said collection plate; and a horizontal chimney tray having open vertical tubular chimneys extending above the normal liquid level on the tray and holes at the bottom of the tray for distribution of liquid there through, said chimney tray being suspended from and supported by the vertical walls of said vessel and being located below said collection plate at a distance that is sufficient to permit on said chimney tray a liquid level that will provide substantially uniform distribution rates of liquid through said holes at variable liquid rates to said chimney 2. The apparatus of claim 1 wherein said U-shaped pipe is horizontal and wherein said means for breaking up said fluid stream further comprises a splash plate connected to said bottom side of said collection plate and positioned at such an angle with said bottom side of said collection plate that said fluid stream being directed toward and impinging upon said splash plate will rebound from the surface of said splash plate against the bottom side of said collection plate.

3. The apparatus of claim 1 wherein said collection plate is sloped downwardly from its outer periphery to said aperture.

4. The apparatus of claim 3 wherein said means for breaking up said fluid stream further comprises a splash plate connected to said bottom side of said collection plate and positioned at such an angle with said bottom side of said collection plate that said fluid stream being directed toward and impinging upon said splash plate will rebound from the surface of said splash plate against the bottom side of said collection plate and wherein said U-shaped pipe is horizontal.

5. Apparatus for inter-bed mixing of a fluid quench medium and a vapor-liquid mixture in a vessel containing at least two adjacent beds of solid contact material having an inlet for said fluid quench medium between said beds of solid contact material, said apparataus being designed for use in said vessel at a location in said vessel such that said apparatus is between said beds of solid contact material and below said inlet, which apparatus comprises: a horizontal vapor-liquid collection plate having an aperture; a vertical cylinder, the bottom side of said collection plate contacting and being sealed to the walls of said cylinder at one end of said cylinder; a U-shaped pipe, a first end of said U-shaped pipe appended to the bottom side of said collection plate at said aperture and the opening at the second end of said U-shaped pipe being below said bottom side of said collection plate and being positioned such that a fluid stream passing through said U-shaped pipe and emanating from said opening of said second end of said U-shaped pipe is directed toward and against a means for breaking up said fluid stream, said means comprising the bottom side of said collection plate; and a horizontal chimney tray having open vertical tubular chimneys extending above the normal liquid level on the tray and holes at the bottom of the tray for distribution of liquid there through, said chimney tray being connected to and suspended from the end of said cylinder that is opposite the end to which said collection plate is attached and being located below said collection plate at a distance that is sufficient to permit on said chimney tray a liquid level that will provide substantially uniform distribution rates of liquid through said holes at variable liquid rates to said chimney tray.

6. The apparatus of claim 5 wherein said U-shaped pipe is horizontal and wherein said means for breaking up said fluid stream further comprises a splash plate connected to said bottom side of said collection plate and positioned at such an angle with said bottom side of said collection plate that said fluid stream being directed toward and impinging upon said splash plate will rebound from the surface of said splash plate against the bottom side of said collection plate.

7. The apparatus of claim 5 wherein said collection plate is sloped downwadly from its outer periphery to said aperture.

8. The apparatus of claim 7 wherein said means for breaking up said fluid stream further comprises a splash plate connected to said bottom of said collection plate and positioned at such an angle with said bottom side of said collection plate that said fluid stream being directed toward and impinging upon said splash plate will rebound from the surface of said splash plate against the bottom side of said collection plate and wherein said U-shaped pipe is horizontal.

9. Apparatus for inter-bed mixing of a fluid quench memdium and a vapor-liquid mixture in a reactor containing at least two adjacent beds of catalyst and having an inlet for said fluid quench medium between said beds of catalyst, said apparatus being designed for use in said reactor at a location in said reactor such that said apparatus is between said beds of catalyst and below said inlet, which apparatus comprises: a horizontal vapor-liquid collection plate having an aperture; a vertical cylinder, the bottom side of said collection plate contacting and being sealed to the walls of said cylinder at one end of said cylinder; a U-shaped pipe, a first end of said U-shaped pipe appended to the bottom side of said collection plate at said aperture and the opening at the second end of said U-shaped pipe being below said bottom side of said collection plate and being positioned such that a fluid stream passing through said U-shaped pipe and emanating from said opening of said second end of said U-shaped pipe is directed toward and against a means for breaking up said fluid stream, said means comprising the bottom side of said collection plate; and a horizontal chimney tray having open vertical tubular chimneys extending above the normal liquid level on the tray and holes at the bottom of the tray for distribution of liquid there through, said chimney tray being connected to and suspended from the end of said cylinder that is opposite the end to which said collection plate is attached and being located below said collection plate at a distance that is sufficient to permit on said chimney tray a liquid level that will provide substantially uniform distribution rates of liquid through said holes at variable liquid rates to said chimney tray.

10. The apparatus of claim 9 wherein said collection plate is sloped downwardly from its outer periphery to said aperture.

11. The apparatus of claim 10 wherein said means for breaking up said fluid stream further comprises a splash plate connected to said bottom side of said collection plate and positioned at such an angle with said bottom side of said collection plate that said fluid stream being directed toward and impinging upon said splash plate will rebound from the surface of said splash plate against the bottom side of said collection plate and wherein said U-shaped pipe is horizontal.

* * * * *

UNITED STATES PATENT OFFICE
CERTIFICATE OF CORRECTION

PATENT NO. : 3,855,068
DATED : December 17, 1974
INVENTOR(S) : Norman P. Lieberman It is certified that error appears in the above–identified patent and that said Letters Patent are hereby corrected as shown below:

the Cover Sheet, line 10 of the Abstract, "pipe" should be -- plate --.
Column 1, line 39, "aparatus" should be -- apparatus --;
" 1, " 43, "treating zone that" should be -- that treating zone --;
" 1, " 53, Between "pipe" and "being", insert -- , a first end of said U-shaped pipe --.
" 3, " 44, Delete "present invention can be used between the".
" 4, " 20, After "the", insert -- bottom side of the --.
" 6, " 14, "fluid" should be -- fluids --.
" 7, " 52, "to" should be -- into --.
" 8, " 9, "leaast" should be -- least --;
" 8, " 31, "there through" should be -- therethrough --;
" 8, " 37, After "chimney" insert -- tray. --;
" 8, " 63, "apparataus" should be -- apparatus --.

" 9, " 35, "downwadly" should be -- downwardly --.
" 10, " 1, "memdium" should be -- medium --;

Signed and Sealed this

Third Day of August 1976

[SEAL]

Attest:

RUTH C. MASON
Attesting Officer

C. MARSHALL DANN
Commissioner of Patents and Trademarks